United States Patent [19]

Zeto et al.

[11] 4,375,027
[45] Feb. 22, 1983

[54] DUAL CHAMBERED HIGH PRESSURE FURNACE

[75] Inventors: Robert J. Zeto, Lincroft, N.J.; Franz X. Zimmerman, Erie, Pa.

[73] Assignee: The United States of America as represented by the Secretary of the Army, Washington, D.C.

[21] Appl. No.: 155,334

[22] Filed: Jun. 2, 1980

Related U.S. Application Data

[60] Division of Ser. No. 13,436, Feb. 21, 1979, Pat. No. 4,235,841, which is a continuation-in-part of Ser. No. 829,883, Sep. 1, 1977, abandoned.

[51] Int. Cl.³ ............................................... B01J 3/04
[52] U.S. Cl. .................................... 219/390; 422/112; 148/189
[58] Field of Search ................. 219/390, 553; 422/199, 422/208, 241, 248; 13/20, 31, 24, 25; 118/50, 50.1, 620, 621; 148/189

[56] References Cited

U.S. PATENT DOCUMENTS

| | | | |
|---|---|---|---|
| 2,976,392 | 3/1961 | Wabnitz | 219/380 |
| 3,409,727 | 11/1968 | Hampton | 13/24 |
| 4,235,841 | 11/1980 | Zimmerman | 13/31 R |

Primary Examiner—B. A. Reynolds
Assistant Examiner—Bernard Roskoski
Attorney, Agent, or Firm—Nathan Edelberg; Sheldon Kanars; Michael C. Sachs

[57] ABSTRACT

The high pressure furnace comprises a cylindrical pressure vessel with front and rear pressure closures. An electrical heating element is supported within the interior of the pressure furnace. The front closure supports a relatively thin-walled inner container opening only to an aperture in the front closure. A small closure plugs the aperture. A reaction frame secures the various closures. Blanket gases are introduced into the furnace chamber and process gases into the process chamber defined by the interior of the inner container. Means are provided for minimizing the pressure difference across the inner container to enable it to maintain its original shape.

2 Claims, 5 Drawing Figures

DUAL CHAMBERED HIGH PRESSURE FURNACE

The Government has rights in this invention pursuant to Contract No. DAAB07-78-C-3011, awarded by Department of the Army, Fort Monmouth, New Jersey.

RELATED APPLICATION

This application is a divisional of Ser. No. 013,436, filed Feb. 21, 1979 now U.S. Pat. No. 4,235,841 which is a continuation-in-part of Application Ser. No. 829,883 filed Sept. 1, 1977, now abandoned.

BACKGROUND

There exists a number of processes in industry where it is desirable to treat a specimen or workpiece with a particular gas at an elevated temperature and pressure. Where the gas is corrosive or reactive with the pressure vessel and/or the electrical heating elements, a substantial problem exists. Double chambered pressure vessel/furnaces in which a container is mounted within a pressure vessel and divides the vessel into two chambers, i.e., a furnace chamber containing the heating elements and an isolated process chamber con- It is an advantage according to this invention that the furnace is divided into a furnace chamber and process chamber by an inner container attached to the front cover of the pressure vessel. Accessibility to the process chamber is very good due to the separate small front closure which can be easily removed. In other words, one end-wall of the process chamber is the end-wall of the pressure vessel and, in particular, a removable portion of that end-wall.

It is an advantage according to this invention to provide a pressure vessel/furnace suitable for oxidation of silicon wafers in the manufacture of integrated circuit chips. The workpiece may be heated to a temperature of 1000° C. in an oxygen atmosphere at 15,000 psi. It is a further advantage to provide a wafer oxidation furnace with superior cleanliness and extremely good temperature uniformity in the process chamber. A uniformity of about ±1° Centigrade is desired. The furnace has associated with it sources of pressurizing, blanketing and processing gases and means for drawing a vacuum on the process chamber. The furnace inner container keeps the process chamber clean, which is very critical for silicon oxidation work. Possible contaminates from the furnace installation will be kept in the furnace chamber gas which is usually argon, helium or nitrogen. The process gas is isolated from the vessel by the furnace inner container, therefore it can be hydrogen or oxygen. Embrittlement and oxidation are kept to a minimum and affect only inexpensive parts such as the inner container and the small cover. The furnace inner container is attached to the cover of the pressure vessel/furnace and can be replaced easily.

Briefly according to this invention, there is provided a double chambered high pressure furnace for treating specimens and workpieces with process gases at elevated temperatures and pressures. The high pressure furnace comprises a cylindrical pressure vessel with a rear closure for sealing one end of the vessel and an apertured front closure for partially sealing the other end of the vessel. An electrical heating element is supported within the interior of the cylindrical pressure vessel near the inner wall thereof from the rear closure. A relatively thin-walled inner container is supported from the front closure and opens only to the aperture in the front closure. The inner container interior defines a process chamber and the inner container exterior along with the pressure vessel and end closures defines a furnace chamber. The process chamber is completed by a small closure for plugging the aperture in the front closure of the vessel. The front closure, small closure and rear closure devices are secured, for example, by a reaction frame. Passageways are provided for introducing blanket gases to the furnace chamber and process gases to the process chamber under high pressures. Sensors detect the differential pressure across the inner container and control valves which maintain the pressure difference across the inner container small so the inner container maintains its original shape.

Preferably, according to this invention, the inner container has a passageway therein opening into the process chamber at the end opposite the small closure. This passageway is in communication with a passageway in the front closure thereby permitting the purging of the process chamber by the introduction of purge gases at the back thereof. It is an advantage of this embodiment that the process gases are heated prior to reaching the process chamber. Thus, they do not tend to quench the workpiece.

Further features and other objects and advantages of this invention will become apparent from the following detailed description made with reference to the drawings in which:

FIG. 4 is a section through an alternate embodiment of the pressure vessel/furnace according to this invention in which the inner container is lined with a double quartz tube or the like.

Figure 1:
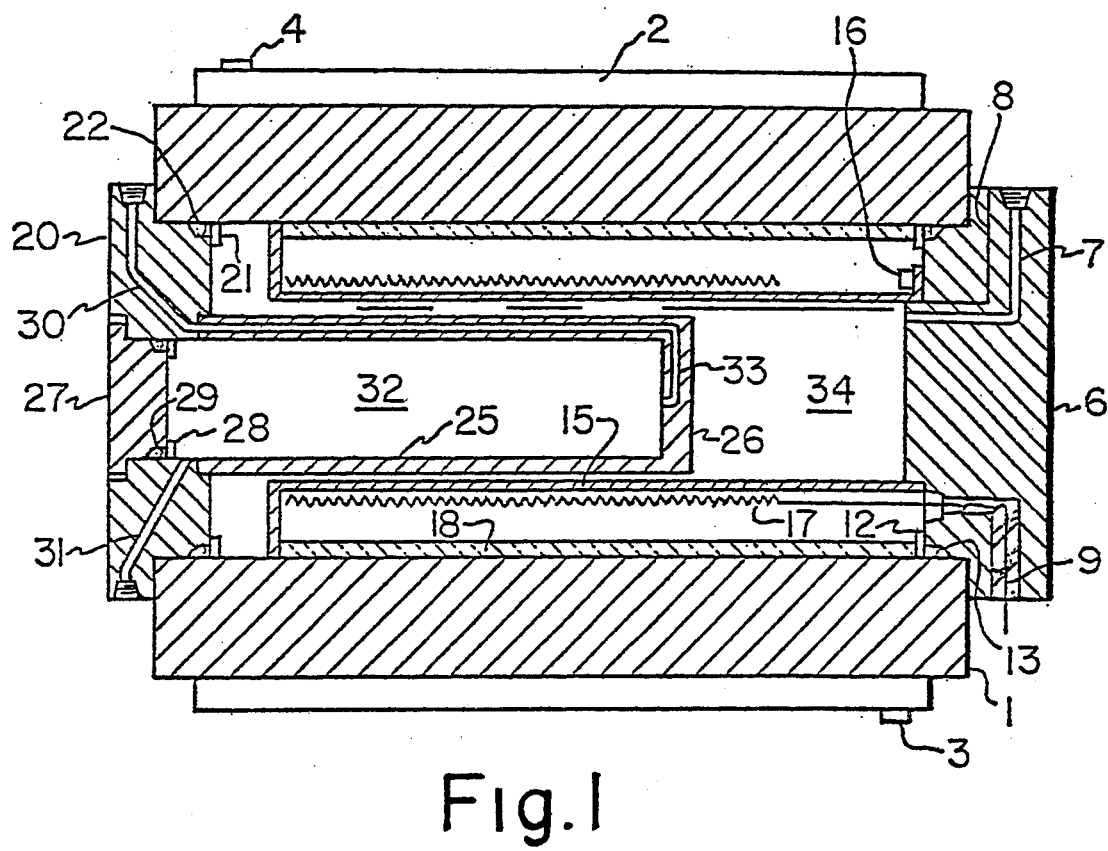
FIG. 1 is a section through a pressure vessel/furnace according to this invention.

Referring now to FIG. 1, there is shown a hollow cylindrical pressure vesel shell 1. The pressure vessel shell is surrounded by a cooling jacket 2 having inlet 3 and outlet 4 conduits for the circulation of cooling fluid through the cooling jacket. The pressure vessel has a rear closure 6 which fits into the cylindrical opening at one end of the pressure vessel, and due to an enlarged portion abuts the end face of the pressure vessel. The rear closure 6 is provided with a passageway 7 for introducing purge gases into the pressure vessel. The passageway terminates in a threaded opening to which a conduit may be secured. The rear closure element 6 is also provided with a thermocoupled feedthrough 8 and an electrical power feedthrough 9.

An annular pressure ring 12 and associated O-ring 13 seal the pressure vessel and the rear closure. A heating element support structure 15 is secured to the rear closure by fasteners 16. Secured to the support structure 15 is an electrical resistance heating element 17 which is supplied electrical energy through the feedthrough 9. An insulated cylindrical lining 18 may be inserted between the pressure vessel shell 1 and the electrical heating element 17. All in all, the furnace portion of the vessel is mounted and integrally connected to the rear cover of the pressure vessel. All electrode power terminals and thermocoupled terminals are connected through the bottom cover. Note that the passageways and feedthroughs do not exit the rear cover on the axial face. This must be free for the reaction frame.

An apertured front cover 20 engages the pressure vessel cylinder and due to an enlarged portion abuts the front end of the vessel. It is sealed thereto by a pressure ring 21 and an associated O-ring 22. The front cover has a cylindrical axially arranged opening. An inner container 25 is threaded to the front cover 20 thereby isolating the portion of the furnace containing the electrical heating element from the interior of the inner container. The inner container has an integral rear end 26 and opens through the aperture in the front cover 20. The opening in the front cover is closed by a small front closure 27, sealing ring 28 and associated O-ring 29. The front closure 20 has passageways 30 and 31 therein for introducing and removing process gases from the chamber 32 formed by the inner container and the small front cover 27. According to a preferred embodiment illustrated in FIG. 1, the inner container 25 has a passageway 33 which opens into the process chamber 32 at the rear thereof through the rear closure of the inner container 26. The inlet passageway 30 of the front closure 20 is arranged to communicate with the passageway 33. In this way, the process gases introduced through passageways 30 and 33 are warmed to the furnace temperature before being introduced to the process chamber. Hence, they do not quench the workpiece within the process chamber as they enter therein. Actually, this preheating of the process gases is essential to good temperature uniformity in the workspace.

Figure 2:
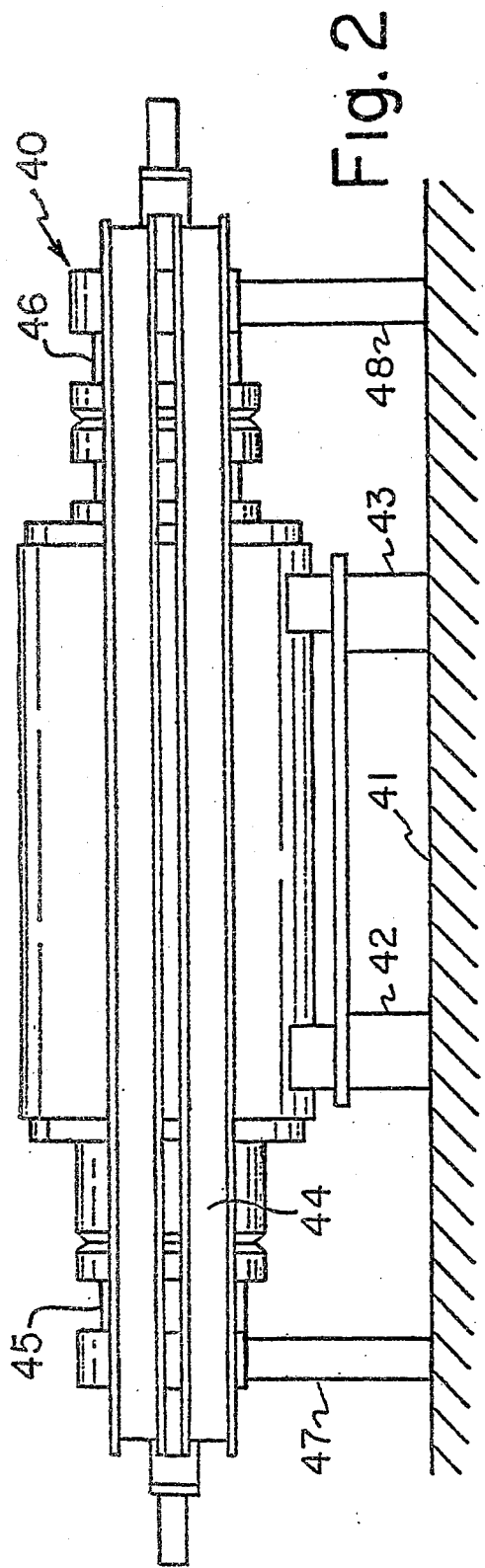
FIG. 2 is an overall view of a pressure vessel/furnace according to this invention mounted within a reaction frame.

Referring now to FIG. 2, there is shown a top view of the pressure vessel/furnace according to this invention positioned within a reaction frame, generally designated as 40. The pressure vessel/furnace is mounted to a side wall 41 by legs 42 and 43. The reaction frame 40 comprises a restraining structure 44 such as a plurality of bands wrapped around end pieces 45 and 46. The end pieces are slidably mounted on legs 47 and 48 so that the frame 40 may be pushed or drawn toward the wall exposing the pressure vessel 1 or it may be pulled over the pressure vessel to secure the front, rear and small front closure devices during pressurization of the vessel. During pressurization, the pressure rings 12, 21 and 28 are forced against associated O-rings 13, 22 and 29 to seal the vessel.

Figure 3:
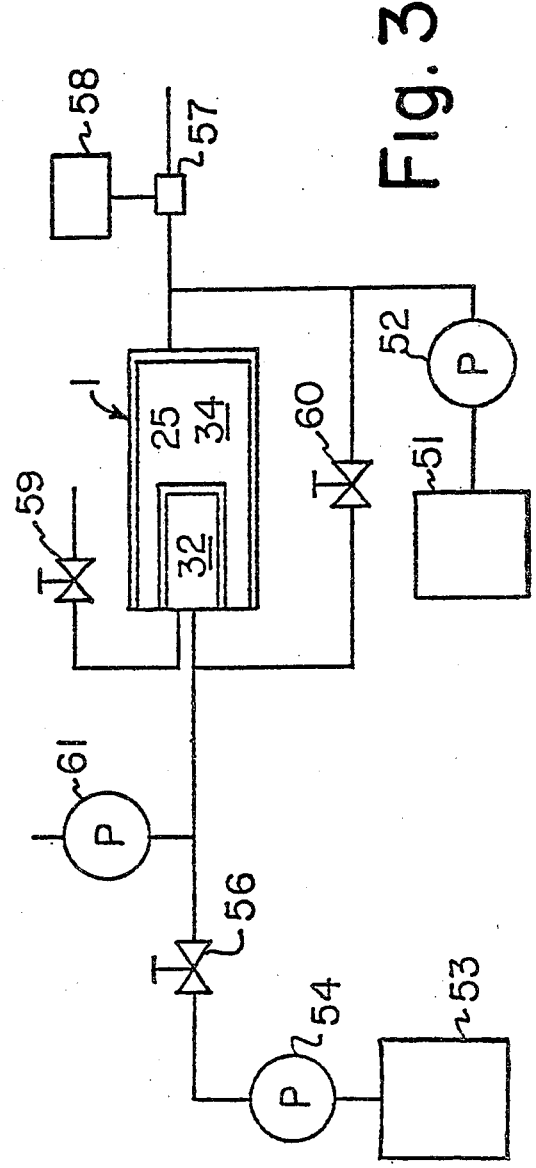
FIG. 3 is a schematic illustrating the plumbing of the purging and process gases to the process chamber and furnace chamber of a high pressure furnace according to this invention.

Referring now to FIG. 3, there is shown the associated high pressure gas circuitry for operation of the pressure vessel furnace. A container for purge or blanket gas 51 is connected to a high pressure pump 52 which is connected to the furnace chamber 34 of the high pressure vessel 1 thereby enabling the pressurization of the furnace chamber with purge gas at high pressures. A source of process gas 53 is connected to a pump 54 which is connected through a valve 56 to the processing chamber 32 of the high pressure vessel. The furnace chamber is connected to a relief valve 57 which is controlled by a differential pressure detector 58 to maintain the pressure difference between the process chamber 32 and the furnace chamber 34 within about 250 psi. The pressure in the process chamber is preferably somewhat in excess of the pressure in the furnace chamber. The process chamber has an outlet through a valve 59 which is the main flow control device. Hence, it is possible to continually regenerate the gas in the process chamber. In certain applications or portions of certain processes making use of the apparatus of this invention it is desirable that the purge gas be introduced to both the process and the furnace chamber. In this case, valve 56 is closed and a valve 60 is opened, which valve connects a conduit between the pump 52 and the inlet to the processing chamber 32.

According to a preferred application of the herein disclosed apparatus, the process chamber has a working zone of about 4 inches in diameter by 6 inches long. A quartz crucible containing the workpiece neatly fits into this volume. The vessel is loaded by pushing the reaction frame horizontally away from the vessel. This gives the operator full access to the cover for loading and unloading. The small cover may be manually removed while the process area is being purged with purge gas introduced at the rear of the process chamber. The apparatus herein is especially suitable for maintaining the furnace hot at all times. In other words, it is not necessary to cool the furnace down to exchange workpieces. The small closure is replaced after loading and the reaction frame is pulled over the vessel. The process chamber is evacuated by a pump 61 which removes the purge gas from the process chamber. Thereafter, the process chamber is pressurized with oxygen to a maximum pressure of 10,000 psi.

Figure 4:
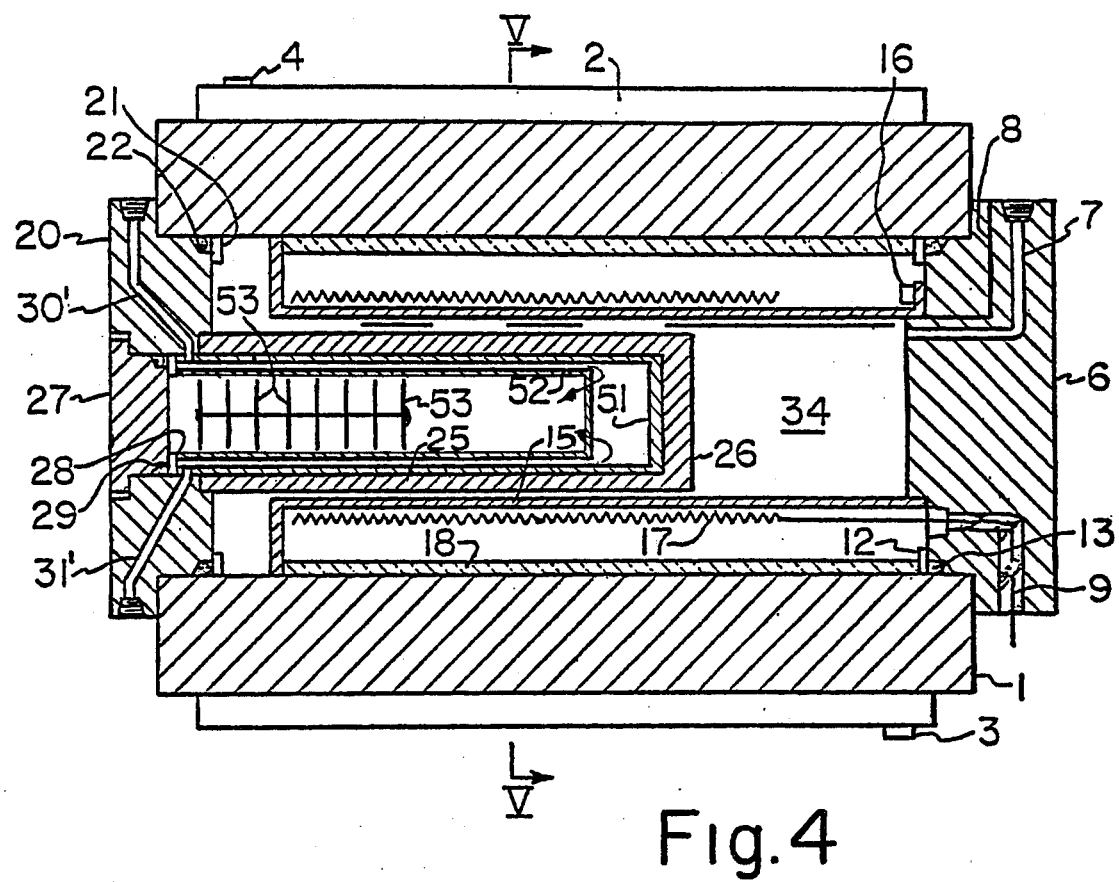
Figure 5:
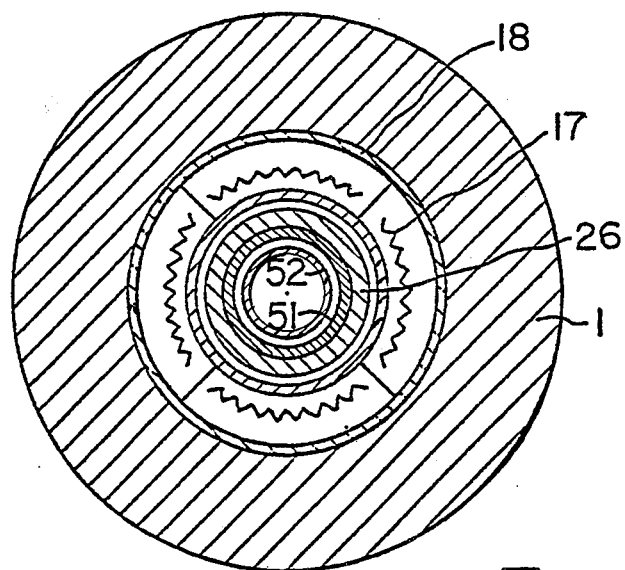
FIG. 5 is a section through the embodiment of FIG. 4 taken along the lines V—V on FIG. 4.

Referring now to FIGS. 4 and 5, there is illustrated a preferred embodiment especially designed to provide the cleanliness and temperature uniformity required for silicon wafer oxidation. In these figures the elements of structure identical with those illustrated in FIG. 1 bear identical numerals. No passageway is provided within the inner container. Rather a first quartz tube 51 with a quartz end piece lines the inner surface of the inner container completely preventing potential contamination from the inner container 26 (the inner container is generally constructed of Inconel). Within the first quartz tube and radially inward thereof is a second quartz tube 52. The annular space between the first and second quartz tubes comprises a passageway. In a preferred embodiment, a helical spacer between the two quartz tubes will define a passageway wrapping around the second tube. The passageway 30' in the front closure 20 is arranged to open into the passageway between the tubes. The passageway 31' in the end closure 20 is arranged to open into the space within the inner or second quartz tube. Thus process gas introduced through passageway 30' passes through the space between the tubes swirling around the outer surface of the inner quartz tube and reaching the process chamber at the rear thereof. The process gas is preheated in the space between the tubes. It enters the space within the second quartz tube, proceeds therethrough and out the vessel. Thus the process gas does not contact metal in the hot region of the furnace. The movement of the process gases through the space between the quartz tube not only preheats the process gases but also distributes heat around the circumference of the tube thus improving temperature uniformity. The spent process gases being continually removed, the process chamber is continually swept taking the contaminants, if any, out of the process chamber.

To prevent convective heat losses near the end adjacent the closure 20 from causing too much cooling of the workspace near that end, a plurality of isothermal plates 53 are arranged to just permit the outflow of process gases from the workspace to the exhaust passage 31'.

It is not only required that the temperature be substantially uniform in the axial direction within the workspace, it should also be substantially uniform from top to bottom. To aid in the control of temperature uniformity, the heating elements may be divided into separately controllable heating elements each within a separate quadrant of the furnace chamber as shown in FIG. 5. The top quadrant heating element and/or side quadrant heating elements may be controlled to dissipate less heat than the bottom quadrant heating element to compensate for natural convection carrying the hottest gases to the top quadrant of the furnace. Incidentally, it would not be necessary to only divide the heating zones into quadrants. One could select a larger number of heating zones spaced around the periphery of the furnace.

While the invention has been described with reference to a particular, preferred embodiment, it will be recognized by those skilled in the art that various modifications and substitutions may be made thereto within the scope of the appended claims without departing from the spirit or scope thereof;

What is claimed is:

1. A double chambered high pressure furnace for treating specimens and workpieces with process gases at elevated pressures and temperatures comprising
   a. a cylindrical pressure vessel,
   b. a rear end closure device for sealing one end of the cylindrical pressure vessel,
   c. an electrical heating element supported within the interior of the cylindrical pressure vessel near the inner wall thereof,
   d. an apertured front end closure device for partially sealing the other end of the cylindrical pressure vessel,
   e. a relatively thin-walled inner container supported from the front closure device and opening only to the aperture in the front closure device, the said inner container interior defining a process chamber, and the inner container exterior along with the pressure vessel and end closure defining a furnace chamber, both chambers being sealed from the atmosphere,
   f. a small closure device for sealing the aperture in the front closure such that the inner container and small closure define a process chamber isolated from the furnace chamber,
   g. means for securing the front closure, small closure and rear closure devices,
   h. means for introducing blanket gasses from a source of pressurized blanket gas to the furnace chamber and process gases from a source of pressurized process gas to the process chamber, said means for introducing process gases comprising passages in said front end closure,
   i. means for minimizing the pressure difference between the gases on each side of the inner container to enable it to maintain its original shape, said minimizing means comprising means for sensing the pressure difference, if any, and in response to that difference, controlling the relative application of the sources of blanket and process gases to the furnace chamber and process chamber respectively, and
   j. means defining a first oxidation resistant liner on the inside of said inner container, means defining a second oxidation resistant liner radially spaced from said first liner, the space between said first and second liners defining a passage opening into the process chamber at the end opposite the front closure, said passage in communication with one of the passageways in the front end closure device whereby purge or process gases passing through said passage are heated before being directed into the process chamber.
   k. additionally comprising within said second oxidation resistant liner isothermal plates serving to reduce cooling at the ends of the workspace.

2. A double chambered high pressure furnace for treating specimens and workpieces with process gases at elevated pressures and temperatures comprising
   a. a cylindrical pressure vessel,
   b. a rear end closure device for sealing one end of the cylindrical pressure vessel,
   c. an electrical heating element supported within the interior of the cylindrical pressure vessel near the inner wall thereof,
   d. an apertured front end closure device for partially sealing the other end of the cylindrical pressure vessel,
   e. a relatively thin-walled inner container supported from the front closure device and opening only to the aperture in the front closure device, the said inner container interior defining a process chamber, and the inner container exterior along with the pressure vessel and end closure defining a furnace chamber, both chambers being sealed from the atmosphere,
   f. a small closure device for sealing the aperture in the front closure such that the inner container and small closure define a process chamber isolated from the furnace chamber,
   g. means for securing the front closure, small closure and rear closure devices,
   h. means for introducing blanket gasses from a source of pressurized blanket gas to the furnace chamber and process gases from a source of pressurized process gas to the process chamber, said means for introducing process gases comprising passages in said front end closure,
   i. means for minimizing the pressure difference between the gases on each side of the inner container to enable it to maintain its original shape, said minimizing means comprising means for sensing the pressure difference, if any, and in response to that difference, controlling the relative application of the sources of blanket and process gases to the furnace chamber and process chamber respectively, and
   j. means defining a first oxidation resistant liner on the inside of said inner container, means defining a second oxidation resistant liner radially spaced from said first liner, the space between said first and second liners defining a passage opening into the process chamber at the end opposite the front closure, said passage in communication with one of the passageways in the front end closure device whereby purge or process gases passing through said passage are heated before being directed into the process chamber, and
   k. additionally comprising a helical spacer surrounding the outside surface of said second oxidation resistant liner, in the said passage between said first and second oxidation resistant liners, said helical spacer permitting a swirling like action on said process gases in their travel through said passage, and
   l. additionally comprising within said second oxidation resistant liner isothermal plates serving to reduce cooling at the ends of the workspace.

* * * * *